United States Patent Office 3,684,565
Patented Aug. 15, 1972

3,684,565
METAL COATED WITH VARNISH FILM AND PROCESS FOR PRODUCING SAME
Erich Psencik, Witten-Bommern, Horst Hermsdorf, Gelsenkirchen-Feldmark, and Horst Vltavsky, Mulheim-Saarn, Germany, assignors to Dynamit Nobel Aktiengesellschaft, Troisdorf, Germany
No Drawing. Filed Nov. 7, 1969, Ser. No. 874,966
Claims priority, application Germany, Nov. 8, 1968,
P 18 07 776.4
Int. Cl. B32b 27/36, 15/08
U.S. Cl. 117—132 BF        17 Claims

ABSTRACT OF THE DISCLOSURE

Fast-to-boiling, sterilizable and highly deformable varnish films are prepared by adding a benzoguanamine resin and a catalyst to an organic solvent solution of a high molecular weight, linear copolyester and forming a film from the resultant mixture. The varnish film is advantageously applied to a metal surface from the solvent solution and then baked thereon at about 100–300° C.

BACKGROUND OF THE INVENTION

This invention relates to the production of varnish films. More particularly, it relates to a process for the production of fast-to-boiling, sterilizable and highly deformable or flexible varnish films. Even more particularly, the present invention relates to varnish films comprising linear, saturated high molecular weight copolyesters which are fast-to-boiling, sterilizable and flexible.

It is known in the art that saturated, linear high molecular weight polyesters or copolyesters exhibit an excellent hardness and adhesion to metals, such as, for example, aluminum, zinc, tin, copper, iron and the alloys thereof. Metal sheets coated with such polyesters can be greatly deformed by flanging, drawing or pressing, without the varnish film being detached from the substrate and without the formation of cracks. However, the coatings have the great disadvantage that they are not fast to boiling and cannot be sterilized. For example, in boiling water or in a steam atmosphere, flaws are produced, such as matting or blister formation of the varnish film, so that such coatings can only be employed for packaging articles to a limited extent.

One of the objects of the present invention is to provide varnish films which overcome the disadvantages and deficiencies of the prior art.

Another object of the present invention is to provide a process for the production of fast-to-boiling, sterilizable and highly deformable varnish films.

A further object of the invention is to provide varnish films made from linear, saturated high molecular weight polyesters which have the advantageous properties described herein.

A still further object of the invention is to provide a process for the production of the described varnish films which may be carried out readily and advantageously in an efficicious manner.

These and other objects and advantages of the present invention will become apparent to those skilled in the art from a consideration of the following specification and claims.

SUMMARY OF THE INVENTION

In accordance with the present invention, it has been discovered that fast-to-boiling, sterilizable and highly flexible varnish films are obtained by adding a benzoguanamine resin to a saturated, linear high molecular weight copolyester, and baking the varnish in the presence of a catalyst at temperatures of 100–300° C. The copolyesters are produced utilizing conventional conditions for the production of polyethylene terephthalate. Thus, dimethyl terephthalate and dimethyl isophthalate are first interesterified with neopentyl glycol and ethylene glycol, whereupon, after distilling off the thus-formed methanol, the condensation of the interesterification product is carried out. In the final product, about 0.25 mole of the above-mentioned starting component is present. The average molecular weight is, as indicated above, about 13,000–22,000.

The varnish films of the invention comprise high molecular weight saturated copolyesters, preferably those containing residues of terephthalic and isophthalic acid. These copolyesters have an average molecular weight of about 13,000–22,000, a hydroxyl number of about 5–10 and an acid number up to about 3. Optionally, copolyesters having residues of aliphatic dicarboxylic acids of 6–10 carbon atoms in mixture with said terephthalic and isophthalic acid residues can be employed. The hydroxy moieties in the polyester structure comprise residues of mixtures of aliphatic glycols of the general formula $HO(CH_2)_nOH$, wherein $n$ represents 2–10, and of 2,2-dimethyl-1,3-propanediol. Accordingly, the copolyesters employed in the present invention are the reaction products of terephthalic and isophthalic acid, optionally in a mixture with aliphatic dicarboxylic acids of 6–10 carbon atoms, with mixtures of aliphatic glycols having from 2 to 10 carbon atoms and 2,2-dimethyl-1,3-propanediol.

The invention is characterized by the addition of suitable benzoguanamine resins to the copolyesters. Catalysts, such as mineral acids (for example, sulfuric acid, hydrochloric acid or phosphoric acid) and/or monoalkyl- or aryl-substituted mineral acids, such as for example p-toluene-sulfonic acid, or salts of these acids, preferably the ammonium or morpholine salts, are also added to the organic solvent solution of the copolyester resin. Mixtures of these acids and salts may, of course, be employed. A preferred catalyst is the morpholine salt of p-toluene-sulfonic acid. As a result, the films obtained become thermoplastic, and any water absorption during the boiling of the baked-in films is prevented.

The coating process using the varnish films of the invention can be conducted in accordance with conventional coating methods. The baking temperatures employed are generally about 100–300° C., the varnish being employed from an organic solvent solution thereof. The varnishes prepared in accordance with this invention are eminently suitable for the coating of articles which must meet the requirements of a high deformability, as well as boiling fastness and sterilizability.

The production of the high-molecular weight linear, saturated copolyesters employed in the invention is conducted in correspondence with the conventional manufacturing technique for preparing polyethylene terephthalate, wherein dimethyl terephthalate is interesterified with ethylene glycol in the presence of suitable catalysts at 150–200° C. and is then polycondensed, after the excess glycol has been distilled off, first under atmospheric pressure and, thereafter, starting from about 240° C., under reduced pressure. The conditions under which this process is conducted are known in the prior art.

As noted above, benzoguanamine resins are added to organic solvent solutions of the copolyesters constituting the varnish films. Preferred benzoguanamine resins for this purpose are those produced by reacting 1 mole of benzoguanamine with 2-4 moles of formaldehyde and then etherifying with 1-2 moles of butanol. A further discussion of the benzoguanamine resins and how they are produced can be found in literature reference Macromolecular Substances by Houben-Weyl, vol. 2, p. 365, 1965 edition.

EXAMPLES OF THE INVENTION

The following examples are given merely as illustrative of the present invention and are not to be considered as limiting. Unless otherwise noted, the percentages therein and throughout the application are by weight.

Example 1

80 parts by weight of a linear, high molecular weight copolyester containing equimolar quantities of the residues of terephthalic acid, isophthalic acid, ethylene glycol and 2,2-dimethyl-1,3-propanediol is dissolved in 186.6 parts by weight of ethyl glycol acetate. To this solution, 28.6 parts by weight of a 70% benzoguanamine resin solution in a 1:1 by volume mixture of butanol and xylene is added. The benzoguanamine resin comprises one mole of benzoguanamine condensed with 2.4 moles of formaldehyde and 1.4 moles of butanol.

The resultant mixture is ground with 125 parts by weight of $TiO_2$ pigment in a grinding mill and is thereafter mixed with 4 parts by weight of a 5% solution of the morpholine salt of p-toluenesulfonic acid in benzyl alcohol.

The films drawn down from this varnish on steel or aluminum sheets are baked, depending on the thickness and the nature of the coated article, for 1-5 minutes at 200-290° C. Extremely adhesive films are thus produced which can be sterilized for 30 minutes at 121° C. in an autoclave with water or stream without detachment from the metal and without the formation of cracks.

Example 2

80 parts by weight of a linear high molecular weight copolyester containing residues of terephthalic acid, isophthalic acid, sebacic acid, 2,2-dimethyl-1,3-propanediol and of ethylene glycol in a molar ratio of 2.1:2.7:0.5:2.7:3.2, respectively, is dissolved in 186.6 parts by weight of ethyl glycol acetate. Added to this solution is 32.3 parts by weight of a 62% benzoguanamine resin solution in butanol. The benzoguanamine resin is the reaction product of one mole of benzoguanamine condensed with 3.7 moles of formaldehyde and 1.5 moles of butanol.

This mixture is ground in a grinding mill with 125 parts by weight of $TiO_2$ pigment and is then mixed with 4 parts by weight of a 5% solution of the morpholine salt of p-toluenesulfonic acid in benzyl alcohol. The films drawn drawn down on steel or aluminum sheets from this varnish are baked, depending on the thickness and nature of the coated article, for 1-5 minutes at 200-290° C.

Films having very good adhesion are produced, which can be sterilized for 30 minutes at 121° C. in an autoclave with water or steam.

The acid catalyst is added to the organic solvent solution of the copolyester in an amount of from about 0.5 to 2% by weight, based on the amount of benzoguanamine resin and about 5-30% by weight of the benzoguanamine resin is added to the organic solvent solution of copolyester.

It is claimed:

1. A process for the production of a fast-to-boiling, sterilizable and highly deformable varnish film comprising a saturated, linear copolyester having an average molecular weight of about 13,000 to 22,000, a hydroxyl number of about 5 to 10, and an acid number up to about 3 which comprises adding 5 to 30% by weight of a benzoguanamine resin, and a catalyst selected from the group consisting of mineral acids and ammonium salts thereof, monoalkyl- and aryl-substituted mineral acids and salts thereof and mixtures of said acids and salts to an organic solvent solution of said copolyester, forming a film from the resultant mixture on a substrate, and heating the film at a temperature of from about 100-300° C.

2. The process of claim 1, wherein said copolyester comprises a reaction product of a mixture containing terephthalic acid, isophthalic acid, aliphatic glycols of the formula $HO(CH_2)_nOH$ wherein $n$ is a whole integer from 2 to 10 and 2,2-dimethyl-1,3-propanediol.

3. The process of claim 1, wherein said copolyester comprises a reaction product of a mixture containing terephthalic acid, isophthalic acid, aliphatic dicarboxylic acids of 6–10 carbons, aliphatic glycols of the formula
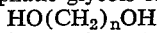
$HO(CH_2)_nOH$
wherein $n$ is a whole integer from 2 to 10 and 2,2-dimethyl-1,3-propanediol.

4. The process of claim 1, wherein about 0.5 to 2% by weight, based on the amount of benzoguanamine resin, of said catalyst is added to the organic solvent solution of copolyester.

5. The process of claim 1, wherein the organic solvent solution of copolyester further includes a pigment.

6. The process of claim 1, wherein the substrate is a metal surface.

7. The process of claim 1, wherein said benzoguanamine resin comprises the condensation reaction product of 1 mole of benzoguanamine, 2-4 moles of formaldehyde and 1-2 moles of butanol.

8. The process of claim 1, wherein said copolyester is the copolyester reaction product of terephthalic acid, isophthalic acid, ethylene glycol and 2,2-dimethyl-1,3-propanediol.

9. The process of claim 1, wherein said copolyester is the copolyester reaction product of terephthalic acid, isophthalic acid, sebacic acid, ethylene glycol and 2,2-dimethyl-1,3-propanediol.

10. The process of claim 1, wherein said catalyst is the morpholine salt of p-toluensulfonic acid.

11. The process of claim 1, wherein said copolyester comprises a reaction product of a mixture containing terephthalic acid, isophthalic acid, and aliphatic glycols of the formula $HO(CH_2)_nOH$ wherein $n$ is a whole integer from 2 to 10.

12. A metal coated with a fast-to-boiling, sterilizable and highly deformable varnish film comprising a saturated, linear copolyester resin having an average molecular weight of about 13,000 to 22,000, a hydroxyl number of about 5 to 10, and an acid number up to about 3, and 5 to 30% by weight of a benzoguanamine resin.

13. The coated metal in accordance with claim 12, wherein the metal is selected from the group consisting of aluminum, zinc, tin, copper, iron and alloys thereof.

14. The coated metal in accordance with claim 12, wherein said copolyester resin is the condensation reaction product of terephthalic acid, isophthalic acid, aliphatic glycols of the formula $HO(CH_2)_nOH$ wherein $n$ is a whole integer from 2 to 10 and 2,2-dimethyl-1,3-propanediol.

15. The coated metal in accordance with claim 12, wherein said copolyester resin is the condensation reaction product of terephthalic acid, isophthalic acid, aliphatic dicarboxylic acids of 6–10 carbon atoms, aliphatic glycols of the formula $HO(CH_2)_nOH$ wherein $n$ is a whole integer from 2 to 10 and 2,2-dimethyl-1,3-propanediol.

16. The coated metal in accordance with claim 12, wherein said benzoguanamine resin comprises the condensation reaction production of 1 mole of benzoguanamine, 2-4 moles of formaldehyde and 1-2 moles of butanol.

17. The coated metal in accordance with claim 12, wherein said copolyester resin is the condensation reaction product of terephthalic acid, isophthalic acid, and aliphatic glycols of the formula $HO(CH_2)_nOH$ wherein $n$ is a whole integer from 2 to 10.

References Cited
UNITED STATES PATENTS

| | | | |
|---|---|---|---|
| 2,683,100 | 7/1954 | Edgar et al. | 260—850 X |
| 2,860,119 | 11/1958 | Petropoulos et al. | 260—850 |
| 3,113,117 | 12/1963 | Gosselink et al. | 117—132 BF X |
| 3,329,739 | 7/1967 | Semroc | 117—161 LN |
| 3,338,743 | 8/1967 | Laganis | 260—850 X |
| 3,329,739 | 7/1967 | Semroc | 117—161 LN X |
| 3,434,985 | 3/1969 | Becker | 260—850 X |
| 3,553,284 | 1/1971 | Riemhofer et al. | 117—132 BF X |

RALPH HUSACK, Primary Examiner

U.S. Cl. X.R.

117—132 C, 161 K, 161 LN; 260—850